United States Patent
Compton et al.

(10) Patent No.: US 10,067,310 B2
(45) Date of Patent: Sep. 4, 2018

(54) FIBER OPTIC DROP CABLE ASSEMBLY

(71) Applicant: Corning Optical Communications LLC, Hickory, NC (US)

(72) Inventors: Brandon Duvall Compton, Granite Falls, NC (US); Kathleen Erin Stover, Fort Worth, TX (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/798,814

(22) Filed: Oct. 31, 2017

(65) Prior Publication Data

US 2018/0120530 A1   May 3, 2018

Related U.S. Application Data

(60) Provisional application No. 62/416,963, filed on Nov. 3, 2016.

(51) Int. Cl.
| | |
|---|---|
| G02B 6/44 | (2006.01) |
| G02B 6/46 | (2006.01) |
| G02B 6/38 | (2006.01) |

(52) U.S. Cl.
CPC ......... *G02B 6/4466* (2013.01); *G02B 6/3887* (2013.01); *G02B 6/443* (2013.01); *G02B 6/4436* (2013.01); *G02B 6/4495* (2013.01); *G02B 6/46* (2013.01)

(58) Field of Classification Search
CPC .. G02B 6/4463; G02B 6/4465; G02B 6/4466; G02B 6/443; G02B 6/4436; G02B 6/4495; G02B 6/3887; G02B 6/46
See application file for complete search history.

(56) References Cited

U.S. PATENT DOCUMENTS

| | | | |
|---|---|---|---|
| 4,684,211 A | 8/1987 | Weber et al. | |
| 4,707,074 A | 11/1987 | Heywood | |
| 4,729,628 A * | 3/1988 | Kraft | G02B 6/4403 |
| | | | 174/117 F |
| 5,013,125 A | 5/1991 | Nilsson et al. | |
| 5,083,875 A | 1/1992 | Cedrone | |
| 5,611,014 A | 3/1997 | Lee et al. | |
| 5,737,470 A | 4/1998 | Nagani et al. | |
| 5,863,083 A | 1/1999 | Giebel et al. | |
| 6,266,469 B1 | 7/2001 | Roth | |
| 6,396,993 B1 | 5/2002 | Giebel et al. | |
| 7,025,509 B2 | 4/2006 | Martin | |
| 7,085,457 B2 | 8/2006 | Lancaster et al. | |

(Continued)

*Primary Examiner* — John M Bedtelyon (57) ABSTRACT

A fiber optic drop cable assembly is disclosed. The fiber optic drop cable assembly includes a fiber optic cable having an unsplit length, with a first split length and a second split length branching from the unsplit length. An optical fiber passage is formed at an interface of the first split length and the second split length. A first strength member extends from the unsplit length and is disposed in the first split length. A second strength member extends from the unsplit length and is disposed in the second split length. At least one optical fiber extends in the optical fiber passage. A fiber optic connector connects to the at least one optical fiber and is releasably secured to one or both of the first strength member and the second strength member. A pulling feature attaches to a portion of the fiber optic drop cable assembly for installation.

21 Claims, 7 Drawing Sheets

(56) References Cited

U.S. PATENT DOCUMENTS

| | | | |
|---|---|---|---|
| 7,672,562 B1 | 3/2010 | Fandl et al. | |
| 8,009,957 B2 | 8/2011 | Utz et al. | |
| 8,385,712 B2 | 2/2013 | Ahmed | |
| 8,538,216 B2* | 9/2013 | Abernathy | G02B 6/4402 385/100 |
| 8,577,199 B2 | 11/2013 | Pierce et al. | |
| 8,620,129 B2 | 12/2013 | Rudenick et al. | |
| 8,630,523 B2* | 1/2014 | Smith | G02B 6/4465 385/113 |
| 8,718,425 B2 | 5/2014 | Pina et al. | |
| 8,737,787 B2 | 5/2014 | Gimblet et al. | |
| 8,876,407 B2* | 11/2014 | Grinderslev | G02B 6/3887 385/69 |
| 8,942,526 B2* | 1/2015 | Lichtenwalner | G02B 6/4429 225/1 |
| 9,020,320 B2 | 4/2015 | Cooke et al. | |
| 9,389,370 B2* | 7/2016 | Pratt | G02B 6/3887 |
| 9,411,101 B2* | 8/2016 | Takahashi | G02B 6/2558 |
| 2008/0317415 A1 | 12/2008 | Hendrickson et al. | |
| 2012/0301090 A1 | 11/2012 | Cline et al. | |
| 2015/0010283 A1 | 1/2015 | Hurley et al. | |

\* cited by examiner

FIBER OPTIC DROP CABLE ASSEMBLY

CROSS REFERENCE TO RELATED APPLICATIONS

This application claims the benefit of priority of U.S. Provisional Application Ser. No. 62/416,963, filed Nov. 3, 2016, the content of which is relied upon and incorporated herein by reference in its entirety.

FIELD

The disclosure relates generally to fiber optic drop cable assemblies, including drop cable assemblies that extend between the outside and inside of subscriber premises, including multiple dwelling units ("MDUs"), used in fiber optic networks to provide optical communication service to a subscriber.

BACKGROUND

As a result of the ever-increasing demand for broadband communications involving voice, video and data transmission, telecommunication and cable media service providers and/or operators have increasingly relied on fiber optics to provide large bandwidth telecommunication service to their subscribers. Fiber optic solutions have become the main part of telecommunication networks. Optical cables can transmit voice, data and video signals over very long distances at very high speed. Because of this, developments in fiber optic telecommunication networks have consistently focused on extending the optical fiber closer to the subscriber to the point that currently the subscriber can be connected directly to the fiber optic network through FTTx (fiber to the specific location "x") technology, including FTTH (fiber-to-the-home) technology, which provides an "all optical" communication network right to the subscribers at their homes. The subscriber premises may be a single-family dwelling or an apartment or portion of a multiple dwelling unit ("MDU").

The last link connecting the subscriber premises to the fiber optic network, and, thereby, to the optical communication service may be in the form of an optical fiber drop cable assembly. Typically, the optical fiber drop cable assembly would extend from a node on the fiber optic network, a multiport terminal on a pole for example, to an optical network terminal (ONT) or network interface device (NID) attached to the exterior of the premises. However, with more frequency, the ONT or NID is being located in the interior of the premises.

Accordingly, the optical fiber drop cable assembly must be able to meet the design, codes and specifications for both outside and inside installation. Additionally, the optical fiber drop cable assembly must be able to be routed in and through walls as well as interior ducts and raceways, including those running in or part of the ceiling, in a cost-effective manner without technically compromising the optical communication service. This requires a fiber optic cable that is rated for and complies with all design, safety and fire criteria, for both outdoor and indoor installations. Further, to support plug and play applications, the fiber optic drop cable assembly may need to be preconnectorized.

Consequently, there is an unresolved need for a fiber optic drop cable assembly that can be routed from a fiber optic network node located outside a customer premises to an ONT or NID located inside the customer premises, can be cost effectively installed on single-family dwellings and MDUs, and can support plug and play installation.

No admission is made that any reference cited herein constitutes prior art. Applicant expressly reserves the right to challenge the accuracy and pertinence of any cited documents.

SUMMARY

One embodiment of the disclosure relates to a fiber optic drop cable assembly, comprising a fiber optic cable, comprising a cable jacket comprising an unsplit length, a first split length and a second split length, wherein the first split length and the second split length branch from the unsplit length, and wherein an optical fiber passage is formed at an interface of the first split length and the second split length; a first strength member, wherein the first strength member extends from the unsplit length and is disposed in the first split length; a second strength member, wherein the second strength member extends from the unsplit length and is disposed in the second split length; and at least one optical fiber, wherein the at least one optical fiber extends in the optical fiber passage. The fiber optic drop cable assembly also comprises a fiber optic connector connected to the at least one optical fiber, wherein the fiber optic connector is releasably secured to one or both of the first strength member and the second strength member. The fiber optic drop cable assembly also comprises a pulling feature attached to a portion of the fiber optic drop cable assembly for installation.

Another embodiment of the disclosure relates to a method of preparing a fiber optic drop cable assembly, comprising branching an unsplit length of a cable jacket of fiber optic cable into a first split length and a second split length, wherein a first strength member is extended from the unsplit length and is disposed in the first split length, and wherein a second strength member is extended from the unsplit length and is disposed in the second split length. The method also comprises forming an optical fiber passage at an interface of the first split length and the second split length, wherein at least one optical fiber extends in the optical fiber passage. The method also comprises connecting a fiber optic connector to the at least one optical fiber. The method also comprises releasably securing the fiber optic connector to one or both of the first strength member and the second strength member. The method also comprises attaching a pulling feature to the fiber optic cable.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1A:
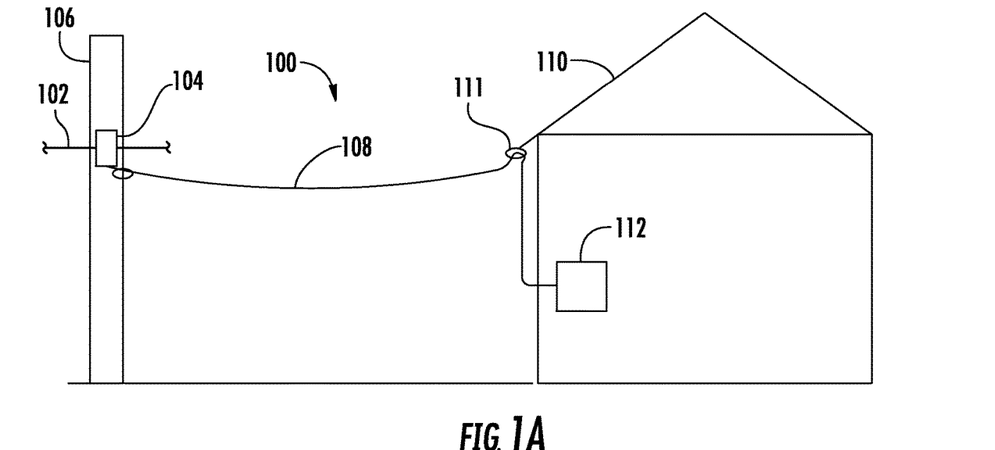
FIG. 1A schematically illustrates a fiber optic drop cable assembly routed from a fiber optic network node to a single-family subscriber premises.
Figure 1B:
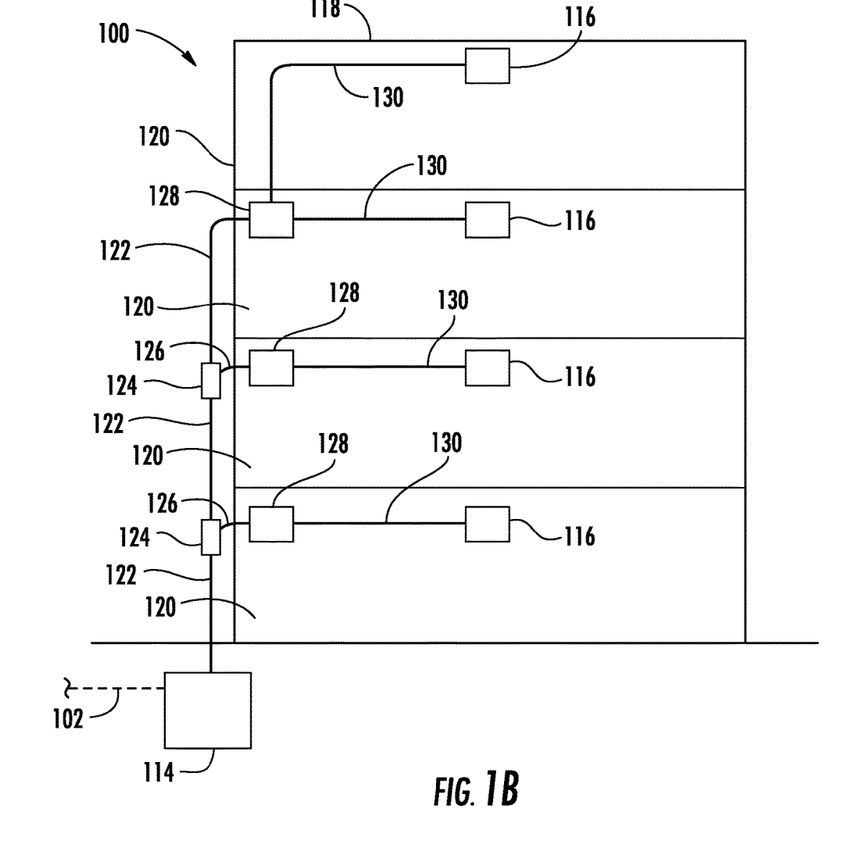
FIG. 1B schematically illustrates fiber optic drop cables routed from a fiber optic network node to different levels of a multiple dwelling unit (MDU)

Referring now to FIGS. 1A and 1B, there are shown two simplified schematic illustrations of the connection of subscriber premises to a fiber optic network 100. In FIG. 1A, the fiber optic network 100 includes a distribution cable 102 connected to a fiber optic network node 104 attached to a pole 106. The distribution cable 102 may provide for optical communication service from a service provider's central office, for example. Accordingly, the distribution cable 102 extends in the fiber optic network 100 so that it will have optical connectivity with the central office (not shown in FIG. 1A). The fiber optic network node 104 may be a multiport device with ports adapted to connect to fiber optic drop cables. In this regard, a preconnectorized fiber optic drop cable 108 connects to one of the ports of the fiber optic network node 104 and extends overhead from the fiber optic network node 104 to a subscriber premises 110. The subscriber premises 110 may be a single-family dwelling. The preconnectorized fiber optic drop cable 108 attaches to the outside of the subscriber premises 110 by any suitable attachment device 111, such as, for example, a pressure clamp, and routes into the subscriber premises 110 extending to an optical network terminal or network interface device (ONT/NID) 112 in the subscriber premises 110.

Turning now to FIG. 1B, the fiber optic network 100 includes the distribution cable 102 routed underground to a fiber optic network node 114 in the form of a buried distribution cabinet that provides optical service to the subscriber premises 116 in a multiple dwelling unit (MDU) 118. The MDU 118 has multiple floors 120. A riser cable 122 connects to the distribution cable 102 and extends vertically in the MDU 118 to provide optical service to the subscriber premises 116 at each of the floors 120. At one or more of the floors 120, the riser cable 122 may have an access point 124 from which a tether cable 126 may optically connect the riser cable 122 to a terminal box 128. The tether cable 126 may be a preconnectorized fiber optic drop cable. At the terminal box 128, a preconnectorized fiber optic drop cable 130 may extend to individual subscriber premises 116 or a group of subscriber premises 116 to provide optical communication service.

In both FIGS. 1A and 1B, the preconnectorized fiber optic drop cable 108, 130 may transition from outside to inside and be routed in ducts or raceways, as applicable, for the subscriber premises, whether single-family or in an MDU. In either case, the preconnectorized fiber optic drop cable 108, 130 may be pulled through restricted and narrow locations or spaces and may be subject to multiple tight bends before reaching its destination. Accordingly, the preconnectorized fiber optic drop cable 108, 130 may kink, snag or break, and/or have the fiber optic connector broken off or separated from the optical fiber. In these cases, the installation of the preconnectorized fiber optic drop cable 108, 130 becomes more difficult, time consuming and expensive.

Figure 2A:
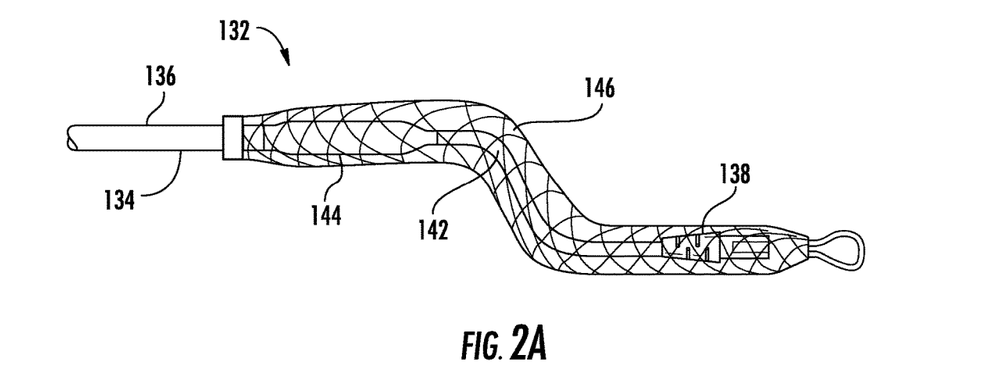
FIG. 2A is a plan view of a conventional upjacketed connectorized optical fiber with a pulling grip.
Figure 2B:
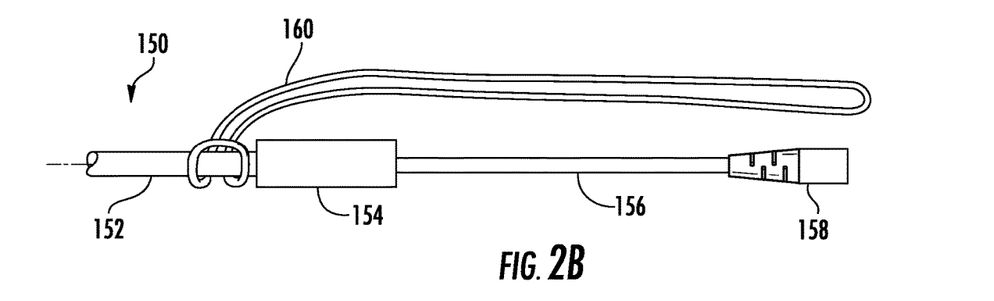
FIG. 2B is a plan view of a conventional connectorized optical fiber extending from a furcation plug with a pulling loop.

FIGS. 2A and 2B illustrate two conventional preconnectorized fiber optic drop cable assemblies used to install drop cable in subscriber premises. In FIG. 2A, the fiber optic drop cable assembly 132 has fiber optic cable 134 with an outer jacket 136. The outer jacket 136 is removed approximately 24 inches from the fiber optic connector 138 exposing the optical fiber (not visible in FIG. 2A). The optical fiber is then upjacketed with a fanout tube 142 attached with a heat shrink 144 or some other fastening feature to the fiber optic cable 134. The fiber optic drop cable assembly 132 with the optical fiber in the fanout tube 142 is inserted in a pulling grip 146 for installation. However, when the fiber optic drop cable assembly 132 is pulled through an exterior or interior wall, or through a duct or raceway, the fanout tube 142 has a tendency to bind and, in extreme cases, cause the fiber optic connector 138 to disconnect from the optical fiber.

In FIG. 2B, the fiber optic drop cable assembly 150 includes a fiber optic drop cable 152, and a furcation plug 154. While the furcation plug 154 adequately secures jacketed optical fibers 156 (the optical fibers not visible in FIG. 2B) and fiber optic connector 158, it does present a much larger cross-section profile making it difficult to pull the fiber optic drop cable assembly 150 through narrow spaces and around tight corners. Additionally, the location of the furcation plug 154 fixes a point on the fiber optic drop cable assembly 150 behind which a pulling loop 160 attaches, and further fixes the length of the optical fiber 156 from the furcation plug 154 to the fiber optic connector 158. Accordingly, once the furcation plug 154 is installed on the fiber optic drop cable assembly 150, the length of the optical fiber 156 to the fiber optic connector 158 cannot be adjusted to address the particular installation need. The installer would then have to carry many fiber optic drop cable assemblies 150 having varying lengths of optical fibers 156 from the furcation plug 154 and/or having excess length of optical fiber 156, requiring the need to develop slack storage of the excess lengths, thereby increasing cost and installation time and effort.

Figures 3, 4:
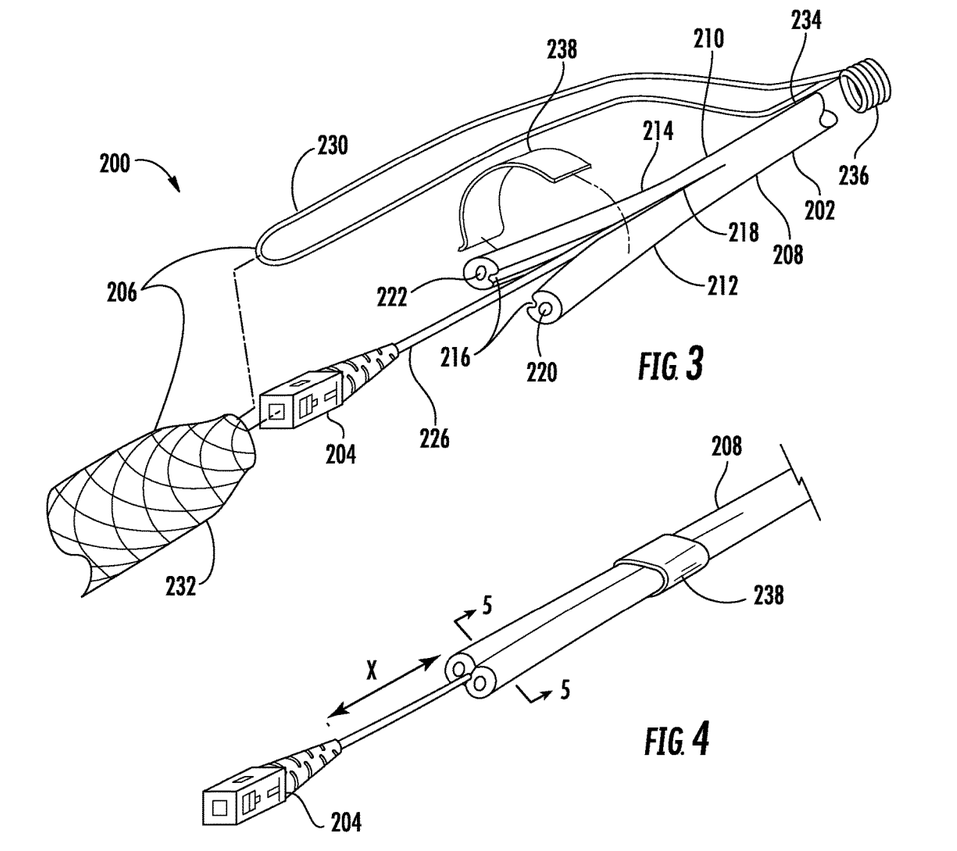
FIG. 3 is a perspective, exploded view of an exemplary embodiment of a fiber optic drop cable assembly, having a fiber optic cable, a fiber optic connector, and a pulling feature.
FIG. 4 is a perspective, partially assembled view of the fiber optic drop cable assembly of FIG. 3.

Referring now to FIG. 3, there is illustrated an exploded view of an exemplary fiber optic drop cable assembly 200. The fiber optic drop cable assembly 200 may include a fiber optic drop cable 202, fiber optic connector 204 and a pulling feature 206. While the fiber optic drop cable 202 may be any suitable fiber optic cable, in FIG. 3, the fiber optic drop cable 202 is shown as a ROC Dielectric Drop Cables with FastAccess Technology as provided by Corning Optical Communications LLC of Hickory N.C. The fiber optic drop cable 202 has a cable jacket 208 with an unsplit length 210, a first split length 212 and a second split length 214. The first split length 212 and the second split length 214 each branch from the unsplit length 210 so that the first split length 212 and the second split length 214 may individually and separately extend from the unsplit length 210. An optical fiber passage 216 may be formed at an interface 218 of the first split length 212 and the second split length 214. A first strength member 220 may be disposed in and extend from the unsplit length 210 to the first split length 212 and be disposed in the first split length 212. A second strength member 222 may be disposed in and extend from the unsplit length 210 to the second split length 214 and be disposed in the second split length 214. At least one optical fiber 226 may extend in the optical fiber passage 216.

The cable jacket 208 may be constructed of any suitable polymer or blends such as polyethylene, flame-retardant polyethylene, flame-retardant PVC, PVDH, and/or other suitable materials. The first strength member 220 and the second strength member 222 each may each be a dielectric member constructed of glass reinforced plastic (GRP) and have a diameter of about 1.25 millimeters. Alternatively, the first strength member 220 and the second strength member 222 may be constructed of a conductive material, such as, for example, steel, or the like. Other sizes, shapes, and/or materials are possible for the strength members 220, 222. The at least one optical fiber 226 may have a flame retardant coating, and have an outside diameter of any appropriate size, as non-limiting examples, the outside diameter of the at least one optical fiber 226, including the flame retardant coating, may be about 900 microns or about 1.6 millimeters.

Figure 6:
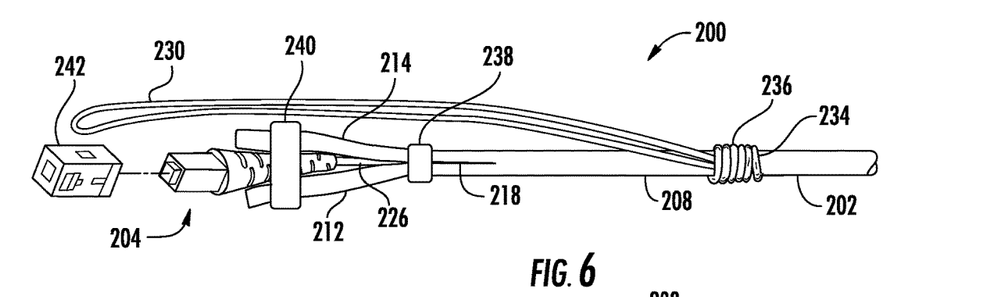
FIG. 6 is a partially assembled plan view of the fiber optic drop cable assembly of FIG. 3 with the strength members disposed in the cable jacket supporting the fiber optic connector.
Figure 6A:
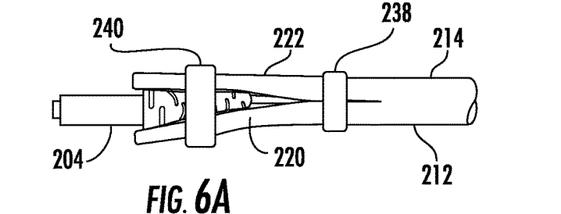
FIG. 6A is a partial detail view of the fiber optic drop cable assembly of FIG. 3 with strength members extended from the cable jacket supporting the fiber optic connector.

With continuing reference to FIG. 3, and also now to FIGS. 4 and 6, a fiber optic connector 204 may be connected to the at least one optical fiber 226. Although in FIG. 3, the fiber optic connector 204 is shown as a SC type, any suitable type of fiber optic connector 204, such as, LC, FC, ST, MT, and MT-RJ may be used. The fiber optic connector 204 may be releasably secured to one or both of the first strength member 220 and the second strength member 222. In this manner, the first strength member 220 and/or the second strength member 222 may provide rigidity and support to the fiber optic connector 204, particularly, as the fiber optic drop cable assembly 200 is being installed. In this regard, one or both of the first split length 212 with the first strength member 220 disposed therein, and the second split length 214, with the second strength member 222 disposed therein, may be extended to the fiber optic connector 204. As shown in FIG. 4, the at least one optical fiber may be extended from the cable jacket 208 a distance of "X". In the case where one or both of the first split length 212 and the second split length 214 extend to the fiber optic connector 204, the distance "X" as shown in FIG. 4 may be effectively zero, with the cable jacket 208 extending up to and/or next to the fiber optic connector 204. This is discussed in more detail with reference to FIG. 6, below. Alternatively, the first strength member 220 may extend out from the first split length 212 and/or the second strength member 222 may extend out from the second split length 214 to the fiber optic connector 204 as shown in FIG. 6A. In this manner, the fiber optic connector 204 may be releasably secured to the first strength member 220 and/or the second strength member 222 without the first split length 212 and/or the second split length 214.

The fiber optic drop cable assembly 200 may include a pulling feature 206, such as, for example, a pulling loop 230 with a protective bundle 232. Although not illustrated in FIG. 3, the protective bundle 232 may include a water-tight or water-resistant cover and a pulling sleeve. This will be discussed in more detail below with reference to FIGS. 7 and 8. The pulling loop 230 may attach to a portion 234 of the fiber optic drop cable assembly 200 by any suitable feature, including a friction knot 236 as is illustrated in FIG. 3. Other attachment features may be used to attach the pulling feature 206 to the fiber optic drop cable assembly 200, including, as non-limiting examples, adhesive tape and a heat shrink material. As shown in FIGS. 3, 4 and 6, removable joining feature 238 may be placed around the cable jacket 208 to join the first split length 212 to the second split length 214 at the interface 218. The removable joining feature 238 may be any suitable removable joining feature, such as an adhesive tape.

Figure 5:
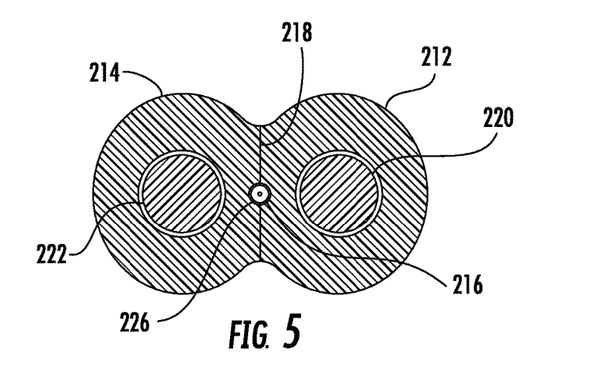
FIG. 5 is cross-sectional view of the drop cable of fiber optic drop cable assembly of FIG. 4 cut along line 5-5.

Turning now to FIG. 5, there is shown cross-sectional view of the fiber optic drop cable 202 taken along line 5-5 of FIG. 4. FIG. 5 illustrates the first split length 212 with first strength member 220 joined to the second split length 214 with second strength member 222 at the interface 218. In this manner, the optical fiber passage 216 is formed at the interface 218, and the at least one optical fiber 226 extends in the optical fiber passage 216.

A view of the fiber optic drop cable assembly 200 in a partially assembled state is shown in FIG. 6. As discussed above, the first split length 212 with the first strength member 220 and the second split length 214 with the second strength member 222 extend next to the fiber optic connector 204. In FIG. 6A, the first strength member 220 extends from the first split length 212 and the second strength member 222 extends from the second split length 214 to the fiber optic connector 204. The fiber optic connector 204 is releasably secured to both the first split length 212 and the second split length 214 using an adhesive tape 240. The removable joining feature 238 joins the first split length 212 and the second split length 214 at the interface 218. The pulling loop 230 is shown attached by way of a friction knot 236 to the portion 234 of the fiber optic drop cable assembly 200 at the cable jacket 208 of the fiber optic drop cable 202. Additionally, shroud 242 may be removed from the fiber optic connector 204 during installation of the fiber optic drop cable assembly 200 to provide a reduced profile of the fiber optic connector 204. The fiber optic drop cable assembly 200 may be pulled through ducts and openings with a shroudless fiber optic connector 204. When the fiber optic drop cable assembly 200 has been installed, the shroud 242 may be attached to the rest of the fiber optic connector 204.

Figure 7:
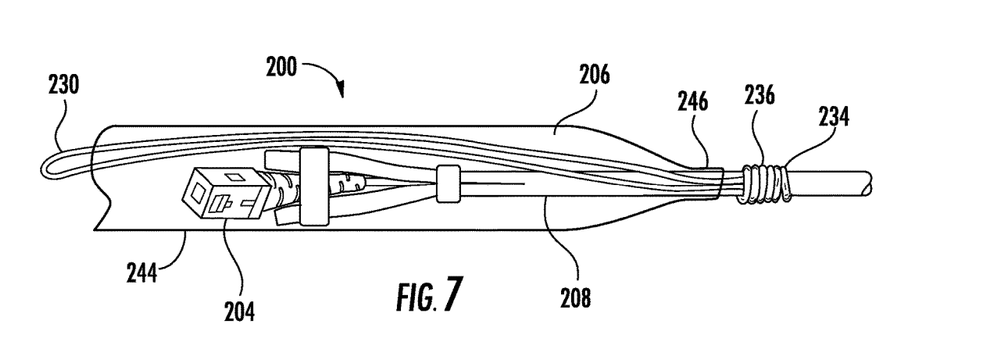
FIG. 7 is a partially assembled plan view of the fiber optic drop cable assembly of FIG. 3 including a protective bundle.
Figure 8:
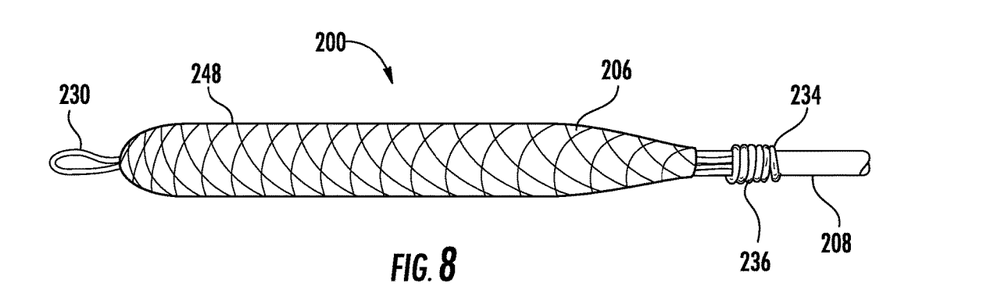
FIG. 8 is an assembled plan view of the fiber optic drop cable assembly of FIG. 3 with a pulling grip.

Referring now to FIG. 7, the fiber optic drop cable assembly 200 is shown in a partially assembled state similar to FIG. 6, except with the pulling feature 206 including a water resistant/water tight cover 244 positioned around the fiber optic connector 204 and the first split length 212 and the second split length 214 of the cable jacket 208. Additionally, the pulling loop 230 may be inserted through the water resistant/water tight cover 244, so that the pulling loop 230 extends out of the water resistant/water tight cover 244 proximal to the fiber optic connector 204. The water resistant/water tight cover 244 may be secured to the fiber optic drop cable assembly 200 by any suitable attachment feature 246, such as, as non-limiting examples, an adhesive tape or heat shrink material. With reference also to FIG. 8, the pulling feature 206 is shown as including a pulling sleeve 248 which may be positioned around the water tight/water resistant cover 244 and secured to the fiber optic drop cable assembly 200. The pulling loop 230 extends out of the end of the pulling sleeve 248. The pulling loop 230 may provide an attachment point for the pulling line (not shown in FIG. 8) for installing the fiber optic drop cable assembly 200.

Figure 9:
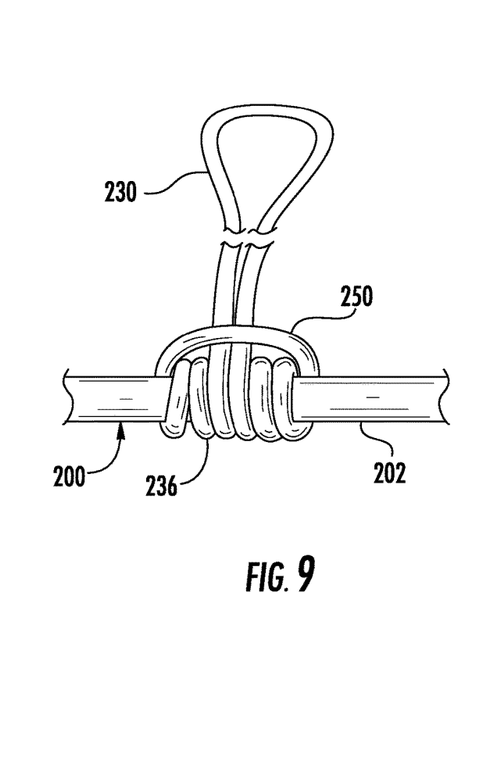
FIG. 9 is a partial detail view of a pulling loop attached to a fiber optic drop cable by a friction knot.
Figure 10:
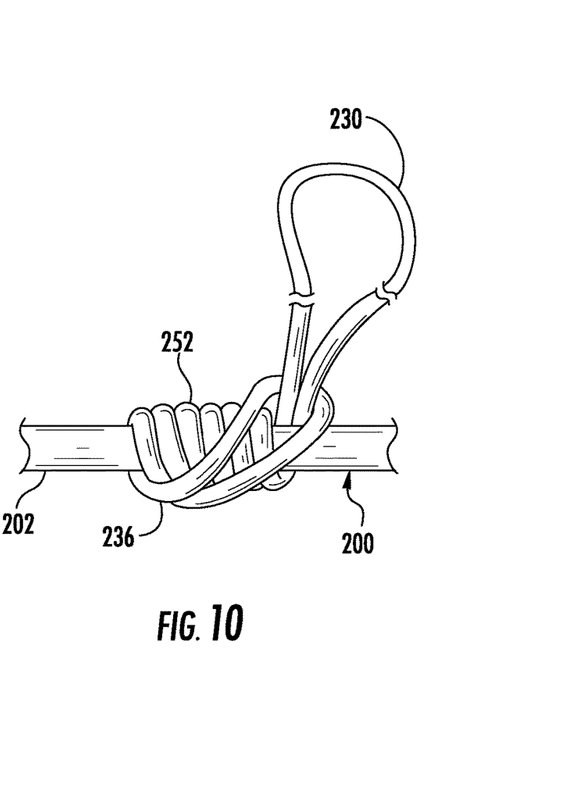
FIG. 10 is a partial detail view of a pulling loop attached to a fiber optic drop cable by a friction knot.

Two types of friction knot 236 are illustrated in FIGS. 9 and 10. In FIG. 9, a Prusik knot 250 is shown; while in FIG. 10 a Klemheist knot 252 is shown. Both the Prusik knot 250 and the Klemheist knot 252 are easily capable of sliding on and off of the fiber optic drop cable assembly 200. When a load is applied to the ends, i.e. to the pulling loop 230, the Prusik knot 250 and the Klemheist knot 252 lock down on fiber optic drop cable 202. The main difference between the two knots is that the Prusik knot 250 may be loaded in either direction, while the Klemheist knot 252 is intended to be loaded only in one direction. The advantage of both knots, allows the knot to be easily tied as well as untied upon removal of the working load. While the Prusik knot 250 and the Klemheist knot 252 are shown in and described with reference to FIGS. 9 and 10, any other friction knots or attachment coupling may be used to attach the pulling loop 230 to the fiber optic drop cable assembly 200.

Figure 11:
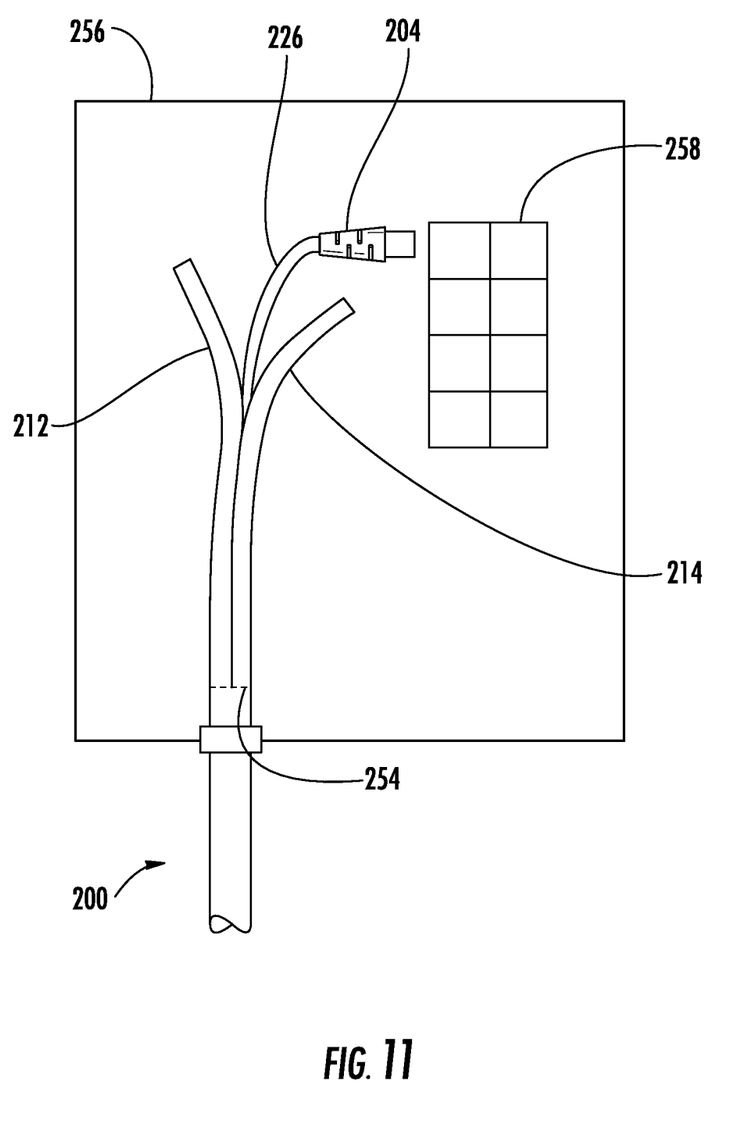
FIG. 11 is a front, partial detail view of a fiber optic drop cable extending into a terminal box.

In FIG. 11, the fiber optic drop cable assembly 200 is illustrated as having been pulled to a connection point, for example, a terminal box 256, which may be an ONT or a NID. At this point, the pulling feature 206 (not shown in FIG. 11) may be discarded. The adhesive tape 240 releasably securing the fiber optic connector 204 to one or both of the first split length 212 and the second split length 214 may be removed as well as the removable joining feature 238 joining the first split length 212 to the second split length 214. The installer, using ordinary scissors, may manually cut off the first split length 212 and the second split length 214 from the unsplit length 210 at a location 254 appropriate for the installation. No specialized tools are needed. Since the at least one optical fiber 226 of the fiber optic drop cable assembly 200 is preconnectorized with fiber optic connector 204, the installer can simply connect the fiber optic connector to a terminal 258 in the terminal box 256.

Figure 12:
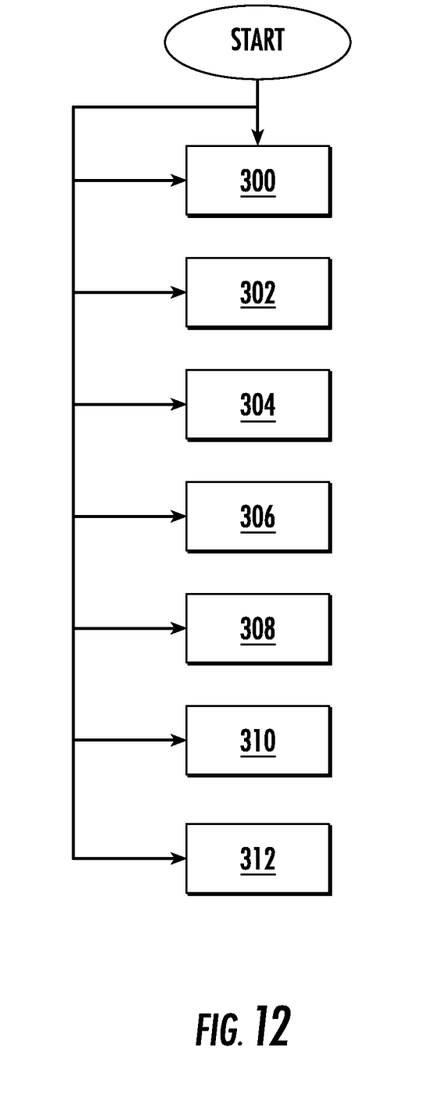
FIG. 12 is a flowchart diagram illustrating an exemplary process for making an exemplary fiber optic drop cable assembly.

FIG. 12 depicts a method of making a fiber optic drop cable assembly 200. The method may be implemented by branching the unsplit length 210 of the cable jacket 208 of the fiber optic drop cable 202 into the first split length 212 and the second split length 214 with the first strength member 220 extended from the unsplit length 210 to, and disposed in, the first split length 212, and a second strength member 222 extended from the unsplit length 210 to, and disposed in, the second split length 214 (block 300); forming the optical fiber passage 216 at the interface 218 of the first split length 212 and the second split length 214, with the at least one optical fiber 226 extends in the optical fiber passage 216 (block 302); connecting the fiber optic connector 204 to the at least one optical fiber 226 (block 304); releasably securing the fiber optic connector 204 to one or both of the first strength member 220 and the second strength member 222 (block 306); and attaching a pulling feature 206 to the portion 234 of the fiber optic drop cable assembly 200 (block 308). The method may further include using the removable joining feature 238 to join the first split length 212 to the second split length 214 (block 310); and attaching a pulling loop 230 to the portion 234 of the fiber optic drop cable assembly 200, the pulling loop 230 may be attached using a friction knot 236 (block 312).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic drop cable assembly, comprising:
    a fiber optic cable, comprising:
        a cable jacket comprising: an unsplit length, a first split length and a second split length, wherein the first split length and the second split length branch from the unsplit length, and wherein an optical fiber passage is formed at an interface of the first split length and the second split length;
        a first strength member, wherein the first strength member extends from the unsplit length and is disposed in the first split length;
        a second strength member, wherein the second strength member extends from the unsplit length and is disposed in the second split length; and
        at least one optical fiber, wherein the at least one optical fiber extends in the optical fiber passage;
    a fiber optic connector connected to the at least one optical fiber, wherein the fiber optic connector is releasably secured to one or both of the first strength member and the second strength member; and
    a pulling feature attached to a portion of the fiber optic drop cable assembly for installation.

2. The fiber optic drop cable assembly of claim 1, further comprising a removable joining feature placed around the cable jacket, the removable joining feature joining the first split length to the second split length at the interface.

3. The fiber optic drop cable assembly of claim 2, wherein the removable joining feature comprises an adhesive tape.

4. The fiber optic drop cable assembly of claim 1, wherein the at least one optical fiber is extended from the cable jacket.

5. The fiber optic drop cable assembly of claim 1, wherein one or both of the first strength member and the second strength member is extended from the cable jacket.

6. The fiber optic drop cable assembly of claim 5, wherein the fiber optic connector is releasably secured to the one or both of the first strength member and the second strength member extended from the cable jacket.

7. The fiber optic drop cable assembly of claim 6, wherein the fiber optic connector is shroudless.

8. The fiber optic drop cable assembly of claim 1, wherein the pulling feature comprises a pulling loop attached to a portion of the fiber optic drop cable assembly.

9. The fiber optic drop cable assembly of claim 8, wherein the pulling loop is attached to a portion of the fiber optic drop cable assembly by a friction knot.

10. The fiber optic drop cable assembly of claim 9, wherein the friction knot comprises a Prusik knot.

11. The fiber optic drop cable assembly of claim 9, wherein the friction knot comprises a Klemheist knot.

12. The fiber optic drop cable assembly of claim 1, wherein the at least one optical fiber comprises a flame retardant coating.

13. The fiber optic drop cable assembly of claim 12, wherein the outside diameter of the at least one optical fiber and the flame retardant coating is about 900 microns.

14. The fiber optic drop cable assembly of claim 12, wherein the outside diameter of the at least one optical fiber and the flame retardant coating is about 1.6 millimeters.

15. The fiber optic drop cable assembly of claim 1, wherein the first strength member and the second strength member each are dielectric members comprising glass reinforced plastic (GRP) having a diameter of about 1.25 millimeters.

16. The fiber optic drop cable assembly of claim 1, wherein the first strength member and the second strength member comprise a conductive material.

17. The fiber optic drop cable assembly of claim 1, wherein the cable jacket comprises a polymer.

18. A method of preparing a fiber optic drop cable assembly, comprising:
  branching an unsplit length of a cable jacket of fiber optic cable into a first split length and a second split length, wherein a first strength member is extended from the unsplit length and is disposed in the first split length, and wherein a second strength member is extended from the unsplit length and is disposed in the second split length;
  forming an optical fiber passage at an interface of the first split length and the second split length, wherein at least one optical fiber extends in the optical fiber passage;
  connecting a fiber optic connector to the at least one optical fiber;
  releasably securing the fiber optic connector to one or both of the first strength member and the second strength member; and
  attaching a pulling feature to the fiber optic cable.

19. The method of claim 18, further comprising using a removable joining feature to secure the first split length to the second split length.

20. The method of claim 18, further comprising attaching a pulling loop to a portion of the fiber optic drop cable assembly.

21. The method of claim 20, wherein the attaching the pulling loop to the portion of the fiber optic drop cable assembly comprises a friction knot.

* * * * *